United States Patent [19]
Prophet et al.

[11] Patent Number: 5,804,231
[45] Date of Patent: Sep. 8, 1998

[54] EXPANDABLE HOT RUNNER MANIFOLD

[75] Inventors: Philip Alan Prophet; Michael Lee Mills, both of Alexandria, Ind.

[73] Assignee: General Motors Corporation, Detroit, Mich.

[21] Appl. No.: 772,636

[22] Filed: Dec. 23, 1996

[51] Int. Cl.$^6$ .................................................. B29C 45/22
[52] U.S. Cl. ...................... 425/570; 264/328.8; 425/572; 425/588
[58] Field of Search .................................. 425/572, 570, 425/588; 264/328.8

[56] References Cited

U.S. PATENT DOCUMENTS

| | | | |
|---|---|---|---|
| 4,702,689 | 10/1987 | Schmidt et al. | 425/570 |
| 4,761,343 | 8/1988 | Gellert | 425/570 |
| 5,032,078 | 7/1991 | Benenati | 425/572 |

*Primary Examiner*—Tim Heitbrink
*Attorney, Agent, or Firm*—Vincent A. Cichosz

[57] ABSTRACT

A manifold for a hot process injection molding apparatus includes a two piece manifold assembly. A first manifold section which includes a longitudinal melt channel and a nozzle drop to a mold is fixably secured to a manifold cavity of the apparatus. A second manifold section also including a longitudinal melt channel is sealably and slidably coupled with the first manifold section for fluidly communicating molding material from the second melt channel to the first melt channel. Expansion and contraction of the manifold sections are taken up by the slidable coupling.

6 Claims, 2 Drawing Sheets

EXPANDABLE HOT RUNNER MANIFOLD

TECHNICAL FIELD

The present invention is related to injection molding tools used in high temperature processes.

BACKGROUND OF THE INVENTION

Known injection molding processes for engineering plastics and resins may typically employ a number of nozzle drops to a corresponding number of dies or injection points. Each such nozzle drop is fed molding material by a manifold. Desired flow characteristics of the molding material are obtained through temperature and pressure controls. Essentially, elevated temperature of the material is controlled at certain areas along the delivery path including the manifold, manifold runners and nozzle drops. Also, injection pressure of the molding material is controlled. Such temperature control is implemented by way of various heating apparatus, including heater plates and band heaters coupled to manifold runners and nozzle drops, respectively. Temperature feedback may be obtained for control purposes by way of conventional thermocouples. Certain injection molding processes employ nozzle drop gate pins to control the flow of molding material while others employ various forms of mold gating to control the flow at locations external the nozzle drop.

Typically in any multiple nozzle drop apparatus, and almost exclusively with relatively long manifold runs, at least certain of the nozzle drops are slidably engaged to the manifold to accommodate expansion of the heated manifold. Certain others of the nozzle drops may be threadably engaged or otherwise fixably secured to the manifold. Interposed between the nozzle drops and manifold in the case of slidably engages nozzle drops are crush bushings. Such crush bushings are typically fabricated from relatively expensive materials such as titanium or alloys thereof. Additionally, slide surfaces require substantial finish processing to provide for acceptably low friction coefficients. Injection molding apparatus of this variety which employs nozzle drop gate pins also requires a degree of freedom with respect to the gate pin guidance typically provided by a stovepipe arrangement. Therefore, the stovepipe, too, is slidably engaged to the manifold runner to accommodate manifold expansion and prevent binding of the nozzle drop gate pin. The finish processing burdens of the stovepipe slide surfaces are also substantial.

Conventional nozzle drop injection molding apparatus of the variety described is acutely affected by process errors, particularly with regard to pressure and temperature parameters of the molding material. Material leakage most typically occurs around the nozzle drop to manifold and manifold to stovepipe areas. Even with careful control of the injection molding process parameters, it is accepted that significant process down time will be experienced to repair failed seals and to clean-up molding material contamination of the apparatus.

SUMMARY OF THE INVENTION

Therefore, it is desirable to reduce the tendency of process parameter variations to cause molding material leaks. It is further desirable to increase the time and cycle life of the apparatus thereby decreasing the down time frequency. Additionally, reductions in burdensome seal tolerancing requirements are desirably sought in an improved injection molding apparatus.

An improved injection molding apparatus is provided which has a static manifold block and an expanding manifold block. The static manifold block is positively located and aligned within the manifold cavity by various locating and centering provisions cooperating with the mold, manifold cavity walls and clamping plate. The expanding manifold block is coupled to the static manifold block by an expansion coupling to allow for normal thermal elongation of the expandable manifold block.

In accordance with a certain preferred feature of the invention, the nozzle drop off of the static manifold block is fixably secured thereto such as by threaded fastening. In accordance with another preferred feature of the invention, a gated nozzle drop has a gate pin which is guided by a fixably attached stovepipe to ensure consistent axial alignment of the gate pin, gate and actuation motion. Yet another preferred feature of the invention is a tapered male fitting end on the static manifold for improved high pressure sealing between the static and expanding manifolds.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
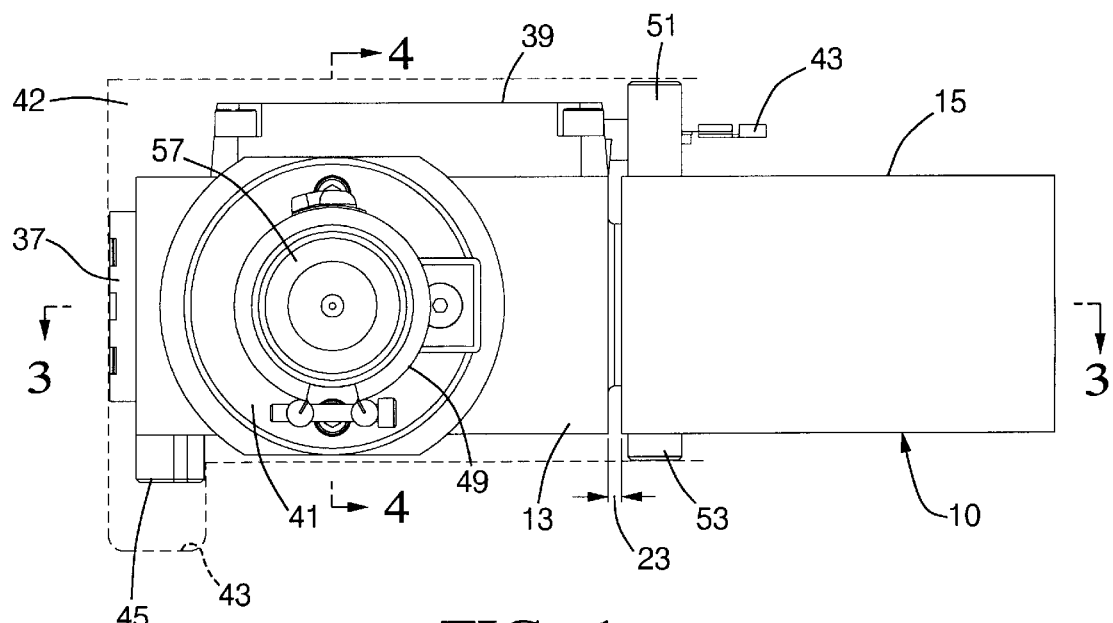
FIG. 1 is a bottom view of portions of an injection molding apparatus in accordance with the present invention.
Figure 2:
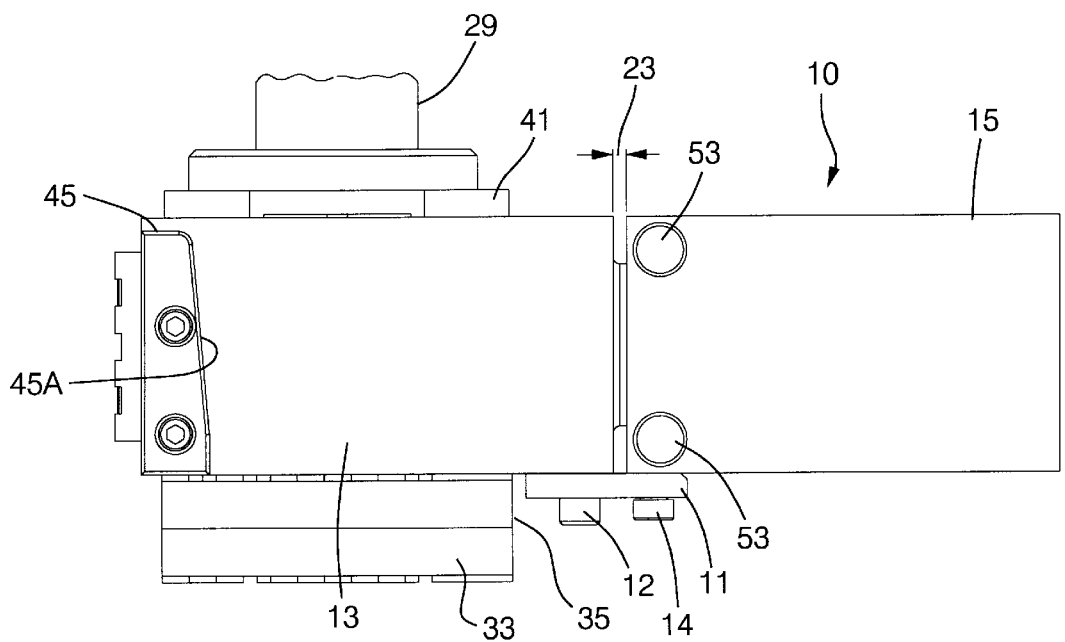
FIG. 2 is a side view of portions of an injection molding apparatus in accordance with the present invention.
Figure 3:
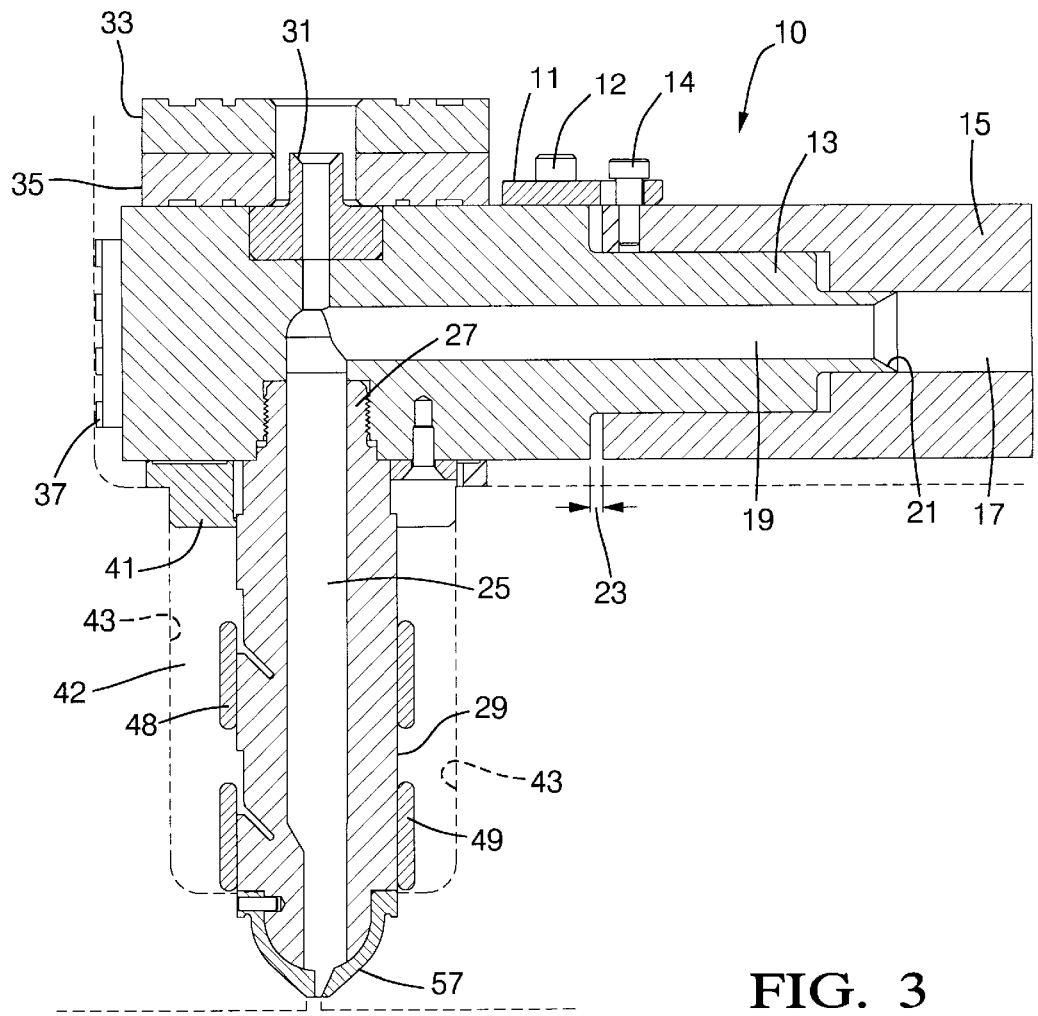
FIG. 3 is a sectional view of the injection molding apparatus as illustrated in FIG. 1 taken along line 3—3 thereof.
Figure 4:
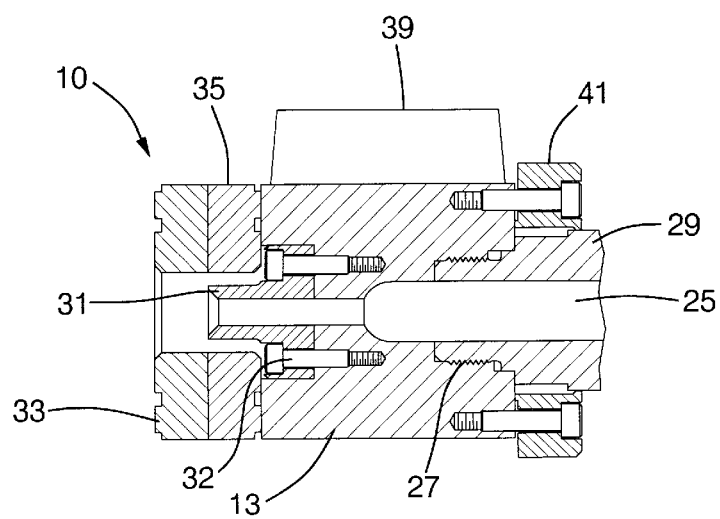
FIG. 4 is a sectional view of the injection molding apparatus as illustrated in FIG. 1 taken along line 4—4 thereof.

With reference to the appended drawings wherein like numerals between the various figures correspond to like features, a preferred embodiment of the present invention is now described. A drop nozzle gated injection molding apparatus is generally designated by the numeral 10 and includes a two piece manifold adapted to take up thermal expansions of the manifold and reduce the expansion stresses. A static manifold block 13 provides a longitudinal melt channel 19 therethrough for commuting pressurized and heated molding material to the manifold nozzle drop 29. At an inlet end of the static manifold block 13, as illustrated to the right in the FIG. 1, the main body thereof takes an exemplary shape of a two-stepped male fitting. The inner wall at the inlet of the melt channel 19 through the two-stepped male fitting has a flared portion 21 for reducing drag on the molding material flowing thereacross. The flared portion 21 is an important feature of the present embodiment since the pressurized molding material tends to deform the flared portion and thereby provide the desired seal between the static manifold block 13 and the expandable manifold block 15. Toward an outlet end of the static manifold block 13 is manifold nozzle drop 29. Manifold nozzle drop 29 has a male threaded portion 27 for engagement to a female threaded opening in the bottom of the static manifold block 13. The female threaded opening of static manifold block 13 is open to the melt channel 19 thereof. Manifold nozzle drop 29 also provides a longitudinal melt channel 25 relative to the drop sense of the nozzle drop and substantially normal to the static manifold melt channel 19. The melt channel 25 of the nozzle drop 29 breaches both extreme ends thereof providing a nozzle outlet through drop nozzle cap 57 at the distal end thereof and a drop nozzle material feed and gate pin passage at the proximal end thereof.

A gate pin (not shown) is substantially axially aligned with and in the melt channel 25 of the nozzle drop 29. The gate pin has a gating end which cooperates with the aperture through the drop nozzle cap 57 to control material flow therethrough. The gating pin further has an actuation end opposite to the gating end which extends upward through the gate pin passage and through stovepipe 31. The termination of the actuation end of the gate pin is operatively coupled to an appropriate actuating mechanism, most typically a hydraulic actuator. Stovepipe 31 is fixably secured to the body of the static manifold block such as by threaded stovepipe fasteners 32.

Surrounding manifold nozzle drop 29 and fastened to the static manifold block 13 is centering collar 41. Centering collar 41 has a slight inner bearing surface for contact with the outer substantially cylindrical surface of the nozzle drop 29 for stabilization thereof. The centering collar 41 also has an outer bearing surface for contact with the manifold cavity wall 43 for positively locating the nozzle drop 29 within the manifold cavity 42.

Located at the distal end of static manifold block 13 is end spacer block 37 for contact against manifold cavity wall 43 of the manifold cavity 42. Located on one sidewall of the static manifold block 13 is guide spacer block 45 which has a tapered surface 45A. Tapered surface 45A aids in set-up by allowing the static manifold block 13 to be inserted within manifold cavity 42 without resistance wherein continued insertion results the guide spacer block 45 locating against the manifold cavity wall 43. Lower and upper spacer blocks, 35 and 33 respectively, are located on top of the static manifold block 13 and provide a surface for a fixture clamp plate (not shown) to bear upon. Upper and lower spacer blocks are further characterized by apertures therethrough to allow actuation access to the gate pin.

Referring again to the inlet end of the static manifold block 13, an expanding manifold block 15 is coupled thereto through the exemplary mating shape of a two-stepped female fitting. The outer walls of the female fitting are slidably engaged to the inner walls of the male fitting. An expanding manifold melt channel 17 opens into the static manifold melt channel. It is here noted that the mating surfaces of the static and expanding manifold blocks 13 and 15 are preferably surface finished by a grinding operation. Additionally, it is an important feature of this embodiment that the diameters of each step be concentric and tightly toleranced to ensure proper fit throughout all phases of expansion and contraction of the manifold blocks. Exemplary tolerances for the various outer diameters of the static manifold block are ±0.0002 inches and for the smaller and larger inner diameters of the expanding manifold are ±0.00025 and ±0.0003, respectively. Nominal clearances between the mating diameters is given at substantially 0.00075 inches and 0.0009 inches for the smaller and larger diameters, respectively. Keeper plate 11 is fixably secured to static manifold block by set bolt 12. Keeper plate has an elongated aperture generally located over the expanding manifold block 15 through which guide bolt passes which in turn is secured to the expandable manifold block. In the various figures, the manifold blocks are shown in a relatively relaxed, that is to say unheated, condition. As such, an axial or longitudinal expansion gap 23 between the manifold blocks is present which provides the freedom of uninhibited axial or longitudinal expansion. To either side of the expanding manifold block 15 are spacer pins 51 and 53 which provide for proper spacing within the manifold cavity 42.

Molding material heating is accomplished indirectly via heating of various portion of the manifold blocks, including as illustrated the nozzle drop 29 and static manifold 13. Nozzle drop 29 is heated by way of a pair of band heaters 48 and 49. The heating by way of the manifold block is accomplished by way of heater plate 39 which is coupled to a current source via electrical connector 43. Similar electrical connectors are provided for the band heaters but are not separately illustrated. In an exemplary application wherein conventional polycarbonate and acrylic molding material are employed, the band heaters and heater plate raise and maintain the manifold and material temperature to between approximately 500 to 600 degrees Fahrenheit. Other higher temperature engineering resins are equally well handled by the expansion apparatus as described.

While the present invention has been described with respect to a preferred embodiment thereof, it is intended to be taken by way of example and not of limitation. It is anticipated that certain alternatives will be apparent to one having ordinary skill in the art and therefore such alternatives are intended to be encompassed by the claims as appended hereto.

We claim:

1. A manifold runner for an injection molding apparatus providing pressurized and heated molding material to an injection molding die, the injection molding apparatus further including a nozzle drop and a manifold cavity, comprising:

a first manifold runner block adapted for positive location within the manifold cavity and in a substantially fixed relationship thereto, the first manifold runner block having an inlet at a respective coupling end for accepting the pressurized and heated molding material therethrough and a respective outlet fixably coupled to the nozzle drop; and a second manifold runner block having a respective outlet at a respective coupling end for delivering the pressurized and heated molding material therethrough, said first and second manifold runner blocks slidably engaged at respective coupling ends to communicate the pressurized and heated molding material from the outlet of the second manifold runner block to the inlet of the first manifold block, whereby expansion of the manifold runner blocks is taken up at the slidably engaged coupling ends.

2. A manifold runner as claimed in claim 1 wherein the respective coupling end of said first manifold runner block comprises a two-stepped male fitting including a first central melt channel and the respective coupling end of said second manifold runner block comprises a two-stepped female fitting including a second central melt channel.

3. A manifold runner as claimed in claim 2 wherein the inlet at the respective coupling end of the first manifold runner block is characterized by a flared opening to the second central melt channel.

4. A manifold runner for an injection molding apparatus providing pressurized and heated molding material to an injection molding die, the injection molding apparatus further including a nozzle drop and a manifold cavity, comprising:

first and second manifold runner sections having respective longitudinal melt channels aligned along a common axis;

a heater coupled to one of the first and second manifold runner sections for heating the molding material passing through the respective longitudinal melt channel;

said first manifold runner section being fixably set relative to the manifold cavity, said first and second manifold runner sections being sealably coupled by an expansion coupling such that the pressurized and heated molding material is fluidly communicable between the respective longitudinal melt channels and longitudinal dimensional changes due to thermal effects are taken up by said expansion coupling.

5. A manifold runner as claimed in claim 4 wherein said expansion coupling comprises a male fitting at an inlet end of said first manifold runner section slidably engaged with a female fitting at an outlet end of said second manifold runner section.

6. A manifold runner as claimed in claim 5 wherein said male fitting further includes a tapered interior wall of said respective longitudinal melt channel at the inlet end thereof.

\* \* \* \* \*